Figure 1:
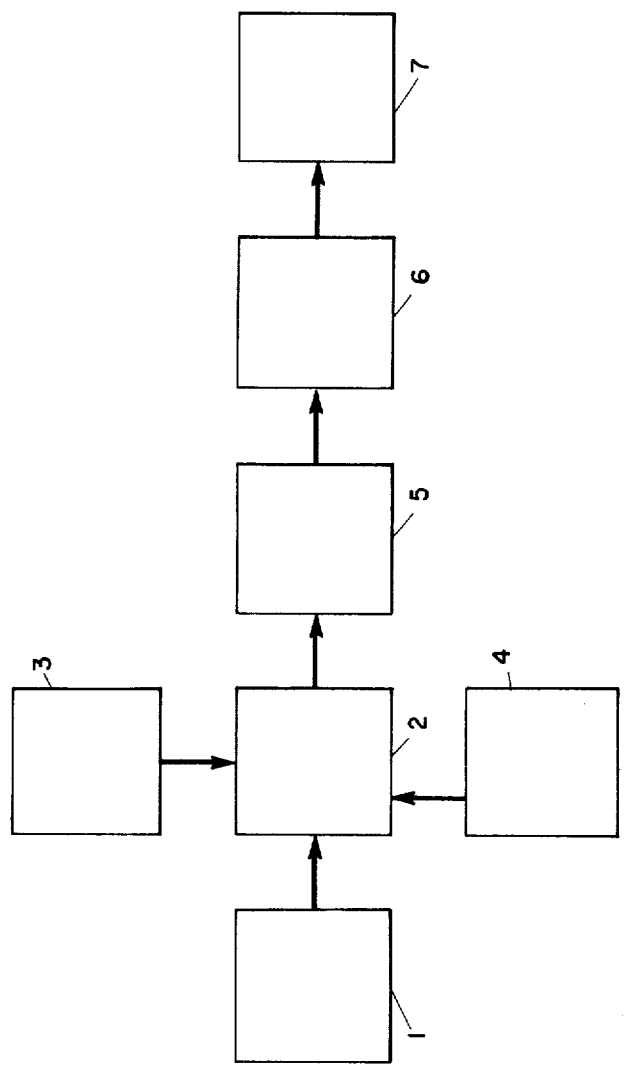

United States Patent [19]

Kaldor

[11] 4,000,051

[45] Dec. 28, 1976

[54] LASER ISOTOPE SEPARATION PROCESS

[76] Inventor: Andrew Kaldor, 331 Timber Drive, Berkeley Heights, N.J. 07922

[22] Filed: Apr. 23, 1975

[21] Appl. No.: 570,850

[52] U.S. Cl. .................. 204/157.1 R; 204/DIG. 11
[51] Int. Cl.² ...................... B01J 1/10; B01D 59/44
[58] Field of Search ............. 204/157.1 R; 250/283, 250/282

[56] References Cited

UNITED STATES PATENTS 3,443,087   5/1969   Robieux et al. ............ 204/157.1 R

FOREIGN PATENTS OR APPLICATIONS 1,284,620   8/1972   United Kingdom ........ 204/157.1 R Primary Examiner—Howard S. Williams

[57] ABSTRACT

The claimed invention is a method of isotope separation based on the unimolecular decomposition of vibrationally excited negative ions which are produced in the reaction of thermal electrons and molecules which have been vibrationally excited in an isotope selective manner. This method is especially applicable to molecules represented by the formula $MF_6$ wherein M is selected from the group consisting of U, S, W, Se, Te, Mo, Re, and Tc.

9 Claims, 1 Drawing Figure

LASER ISOTOPE SEPARATION PROCESS

CROSS REFERENCE TO RELATED APPLICATIONS

This application is related to copending application, U.S. Ser. No. 408,669, filed on Oct. 23, 1973, in the name of R. K. Lyon and the CIP thereof, filed on the same day herewith, both of which are incorporated by reference. This application, like U.S. Ser. No. 408,669 and the CIP thereof, is related to isotope separation processes wherein, in a first step, IR radiation is utilized to selectively excite one isotope of an isotopic mixture at conditions wherein multiple infrared photon absorption takes place, and said excited isotope is converted in a second step, to a form which can be removed from said mixture. This application differs from U.S. Ser. No. 408,669 and the CIP thereof, in that the second step is limited to the combination of thermal electrons with said excited isotope to form negative ions which undergo unimolecular decomposition to form an ion fragment which can be subsequently separated from said isotopic mixture.

FIELD OF THE INVENTION

The instant invention relates to a process for separating a compound into two or more parts in each of which the abundances of the isotopes of a given element differ from the abundances of the isotopes of the same element in said compound. In one embodiment, the invention relates to a method for the isotopically selective vibrational excitation of gaseous compounds, preferably having the general formula $MF_6$, wherein M is selected from the group consisting of U, S, W, Se, Te, Mo, Re, and Tc, more preferably $UF_6$ or $SF_6$ by multiple infrared photon absorption followed by simultaneously and/or subsequently attaching thermal electrons to said vibrationally excited compounds to form negative ions which decompose to ion fragments and are separated from the unexcited compounds. Compounds of the formula $MF_6$ which are vibrationally excited to a critical energy will decompose to $MF_5$ species, e.g., $UF_5^-$ and $SF_5^-$. The ions thus produced will be separated by means known in the art. These negative ions will be enriched in the isotope of the species which was preferentially vibrationally excited. The negative ions formed from unexcited compound, e.g., $UF_6^-$ and $SF_6^-$ may be also collected to yield a fraction which is enriched in the unexcited isotope.

BACKGROUND OF THE PRIOR ART

In order that the instant invention may be clearly understood, it is useful to review the prior art relating to photochemical isotope separation. U.S. Pat. No. 2,713,025 and British Pat. No. 1,237,474 are good examples of processes for the photochemical separation of the isotopes of mercury. The first requirement for a photochemical isotope separation is that one finds conditions such that atoms or molecules of one isotope of a given element absorb light more strongly than do atoms or molecules of another isotope of said element. Mercury is a volatile metal and readily forms a vapor of atoms. Said atoms absorb ultraviolet light at 2537 A. The absorption line of $Hg^{202}$ is displaced by about 0.01 A with respect to the absorption line of $Hg^{200}$. Since the absorption lines are extremely narrow, one may by use of a light in a critically narrow wavelength region excite either $Hg^{200}$ or $Hg^{202}$.

The second requirement for a photochemical isotope separation is that those atoms or molecules which are excited by light undergo some process which the atoms or molecules which have not been excited do not undergo, or at least do not undergo as rapidly. A quantum of 2537 A ultraviolet light imparts an excitation of 112.7 Kcal/mole to the mercury atom which absorbs it. The number of mercury atoms which at room temperature are thermally excited to this energy is vanishingly small, hence the atoms excited by light are not diluted by atoms excited by thermal means. Atoms of this high excitation readily undergo reactions with $H_2O$ (as taught in the U.S. patent) or with $O_2$, HCl or butadiene (as taught in the British patent), said reactions not occurring at room temperature with unexcited mercury.

Uranium, however, is a highly refractory metal, boiling only at extremely high temperatures. Thus, use of the above-described process with uranium atoms instead of mercury involves obvious difficulties. The most volatile form of uranium is $UF_6$. $U^{235}F_6$ and $U^{238}F_6$ both absorb ultraviolet light and do so to nearly the same extent at all wavelengths in the UV; hence, UV excitation of $UF_6$ does not satisfy the first requirement of photochemical isotope separation. However, $UF_6$ will also absorb infrared light in the region around 626 $cm^{-1}$ (the $V_3$ band) and 189 $cm^{-1}$ (the $V_4$ band). Both the $V_3$ and $V_4$ bands of $U^{235}F_6$ are shifted respectively, but the size of these shifts is small compared to the width of the bands; in other words, the infrared absorption spectra of $U^{238}F_6$ and $U^{235}F_6$ do not exactly coincide, but they overlap at all wavelengths so that if one isotope absorbs light, so, to a substantial degree, will the other. Hence, the infrared excitation of $UF_6$ by absorption of a single IR photon is a process of limited isotopic selectivity.

Similar problem exists with respect to other species, such as sulfur. The vapor composition of sulfur is very complex and is determined by the temperature of the system. One of the most volatile compounds of sulfur is $SF_6$. $^{32}SF_6$ and $^{34}SF_6$ both absorb vacuum ultraviolet light, and with the possible exception to vibronic structure, there is no difference in the absorption spectra. $SF_6$ does absorb infrared radiation in the region about 948 $cm^{-1}$ and the infrared absorption spectrum of $^{32}SF_6$ and $^{34}SF_6$ shows an isotope shift. In this case, in contrast to $UF_6$, it is possible to find regions of the infrared absorption spectrum where one isotope will absorb light, and to a substantial degree, the other will not. The thermal hot band species limits, however, the utility of a single photon excitation in terms of preparing the species for separation.

The second requirement for isotope separation is also a matter of some difficulty for $UF_6$, $SF_6$, and other $MF_6$ species. $MF_6$ molecules which are excited by IR light are not necessarily different from molecules which have been excited to the same energy level by thermal excitation. Most processes the photoexcited molecules will undergo, those molecules which are thermally excited to the same energy level will also undergo. This dilution of the photoexcited molecules with thermally excited molecules will further decrease the isotopic separation factor.

The instant invention is a three-step process, which may be illustrated by the isotope separation of $UF_6$. In the first step the $UF_6$ molecules to be isotopically separated are irradiated with a powerful infrared laser for a time of less than $10^{-3}$ seconds under conditions such that at least 0.1% of the $U^{235}F_6$ or $U^{238}F_6$ molecules being irradiated absorb an energy of more than 2400 cm$^{-1}$ which is equivalent to a vibrational energy content of 4 $\nu_3$. This may be done by use of the process of sequential multiple photon absorption, i.e., if UF$_6$ is irradiated at a power density greater than $10^4$ watts per cm$^2$ per torr pressure of UF$_6$ in the presence of a second gas, said second gas having a partial pressure of at least 5 times the partial pressure of the UF$_6$, then the UF$_6$ may be sequentially excited from the ground vibrational state to the first excited vibrational state to the second excited vibrational state to the third excited vibrational state to the fourth excited vibrational state, etc., the isotopic selectivity of each excitation step being compounded as the sequential excitation proceeds. This excitation may be also achieved by a number of other multiphoton absorption processes, now known in the art, none of which necessarily require the presence of the second gas. Similar conditions would hold for SF$_6$ and other MF$_6$ species. It is noted that efficient isotope separation by electron attachment requires that the preferentially excited molecules be excitated above the thermal vibrational energy content. That is, the preferentially excited molecules must be excited with at least 4 quanta in the $\nu_3$ vibrational mode.

The second step of the instant invention is the reaction of the vibrational excited compound, e.g., UF$_6$, SF$_6$ and other MF$_6$ species with thermal electrons, said thermal electrons being generated by means known in the art. The ratio of thermal electrons to total MF$_6$ species should be at least 0.1. Charge neutrality in the experimental apparatus can be maintained by using means known in the art as further illustrated below. The total time in which the MF$_6$ species is in contact with the thermal electrons both before and after said irradiation should be less than $10^{-3}$ seconds.

The reasons for the above requirements and the preference for thermal electrons are complex and are related to the problem of the thermal dilution. As indicated above, UF$_6$ molecules as well as other vibrationally excited compounds which are excited in an isotopically selective manner by an IR laser will be diluted with UF$_6$ or other MF$_6$ molecules thermally excited to the same energy levels. It is the teaching of the instant invention that this undesirable dilution effect is to be minimized by rapidly exciting a significant fraction (more than 0.1%) of said isotopic compound, which in the case of UF$_6$ may be either the $U^{235}F_6$ or $U^{238}F_6$. Once the photoexcited (vibrationally excited) molecules are formed, they will be converted into ions by reaction with the thermal electrons and they will be removed by deexcitation processes. The thermally excited molecules will also be removed by reaction and deexcitation but new thermally excited UF$_6$ molecules will be continually formed from unexcited UF$_6$ molecules. Thus, after irradiation by the IR laser the ratio of photoexcited molecules to thermally excited molecules will continually decrease and the undesirable dilution will continually increase. Under most conditions, the lifetime of the photoexcited UF$_6$, for example, will be $10^{-3}$ seconds or less and it is the teaching of the instant invention that both the irradiation time and contact time be less than $10^{-3}$ seconds in order to minimize the dilution effect.

Since this very limited time is available for reaction between photoexcited UF$_6$ and the thermal electrons, it is necessary to use said thermal electrons in considerable excess over the photoexcited UF$_6$ in order to achieve an acceptably efficient recovery of the latter. Hence, the instant invention teaches that the ratio of thermal electrons to total UF$_6$, for example, must be at least 0.1.

The use of thermal electrons as the reagent with which the photoexcited UF$_6$ reacts is advantageous for a number of reasons. First, there is a general advantage of thermal electrons over other reagents. The attachment rate constant of thermal electrons is known to be very fast, faster than any known chemical reaction rate constant. Secondly, it is well known that when a vibrationally excited molecule collides with an unexcited molecule the excitation may be transferred leaving the former molecule unexcited and the latter molecule excited. This process is called V—V transfer and it can be an extremely efficient process. If one attempted to react the photoexcited UF$_6$ with a molecular reagent, V—V transfer could result in the rapid loss of the photoexcited UF$_6$. The use of thermal electrons which cannot undergo V—V transfer avoids this danger.

Third, thermal electrons have the advantage of being readily generated in situ by bombardment of Helium gas by particles emitted from radioisotopes and by other means known in the art.

Fourth, the species formed upon the attachment of thermal electrons to excited SF$_6$, UF$_6$ and other MF$_6$ species will very rapidly dissociate and yield MF$_5^-$ species. Those molecules not possessing the critical internal energy contact will form only MF$_6^-$. The two species can then be separated by a number of techniques known in the state of the art.

Among others, these may, for example, be chemical reactions of the ions such that MF$_5^-$ + X → X$^-$ + MF$_5$, when MF$_5$ is a precipitate, and MF$_6^-$ + X → X$^-$ + MF$_6$, when MF$_6$ is a gas phase species.

From the above description, the instant invention is readily distinguished from the prior art. Thus, U.S. Pat. No. 3,443,087 teaches the separation of $U^{235}F_6$ from $U^{238}F_6$ by selectively exciting one of them with an infrared laser then ionizing said excited molecules with ultraviolet light and recovering the ions by means of electric and/or magnetic fields or chemical reactions. In a review entitled "Photochemical Isotope Separation As Applied to Uranium" (Union Carbide Corporation Nuclear Division, Oak Ridge Gaseous Diffusion Plant, Mar. 15, 1972, K-L-3054, Revision 1, page 29), Farrar and Smith discuss the above-mentioned patent and comment unfavorably on the practicality of the proposed second step of photoionization. As an alternative, they suggest photodissociation.

British Pat. No. 1,284,620, German Pat. No. 1,959,767 and German Pat. No. 2,150,232 teach the use of infrared radiation to selectively excite molecules which then undergo a chemical reaction which the unexcited molecules undergo more slowly. Only one example of such a reaction is given, the thermal decomposition of U(BH$_4$)$_4$.

In all the above references the energy given the molecules in the photoexcitation step is explicitly taught to be that of one IR photon, which for UF$_6$ is less than the excitation of at least 2400 cm$^{-1}$ taught in the instant invention. None of the above references teach, show or suggest the advantage of exciting a substantial fraction of either the $U^{235}F_6$ or the $U^{238}F_6$ and thereby reducing thermal dilution, nor do they teach, show or suggest the need for very short irradiation time and very short contact time, nor do they teach, show or suggest the use of thermal electrons to efficiently recover the photoexcited $UF_6$, nor do they teach, show or suggest the use of unimolecular decomposition of vibrationally excited negative ions produced by the attachment of thermal electrons as the means to efficiently recover the photoexcited $SF_6$, $UF_6$, and other $MF_6$ species.

PREFERRED EMBODIMENT

Sulfur of natural isotopic distribution may be separated according to the scheme given below with reference to the FIGURE.

Sulfur is converted to $SF_6$ vapor by means known in the art and mixed with helium in zone 1. This mixture is passed into a reaction zone 2 where it is irradiated, in a pulsed mode, with a $CO_2$ laser (3) and said irradiated mixture is contacted simultaneously with thermal electrons from a source thereof (4) which may be, for example, an electron gun. The ions thus formed, i.e., $SF_6^-$ and $SF_5^-$ are removed by means of an ion extractor (5) and separated from each other by means of a mass Filter (6) which may be an applied electromagnetic field. Either $SF_5^-$, which is enriched $^{32}S$ or $SF_6^-$, which is enriched in $^{34}S$, may be collected, by adjustment of said mass filter, in collection zone (7).

The $CO_2$ laser is operated on the P (12) and P (14) transitions of the 10.6 $\mu$ band at a power density of $10^4$ watts/cm$^2$ per torr of $SF_6$ for an irradiation time of $10^{-8}$ to $10^{-6}$ seconds, to produce molecules of $^{32}SF_6$ with 3760 to 4000 cm$^{-1}$ internal energy. The partial pressure of $SF_6$ in said reaction zone is maintained at from $10^{-4}$ to 10 torr. The thermal electrons are provided at a partial pressure of from 0.01 to 100 times the partial pressure of $SF_6$, and helium is provided at a partial pressure of from 0.01 to 1000 times the partial pressure of $SF_6$.

The contacting of said $SF_6$, said thermal electrons, and said helium is carried out at the equivalent temperature of from 40° K to 600° K for a time of less than $10^{-3}$ seconds.

Under the above conditions, the reaction sequence $SF_6^* + e^- \rightarrow (SF_6^-)^* \rightarrow SF_5^- + F$ occurs with isotopic selectivity and the $SF_5^-$ may be recovered by any of the means known in the art, including, as exemplified, mass filtering through an applied electromagnetic field.

The process may be operated in a continuous manner. The gas mixture in the reactor is subjected to enough laser pulses to produce the desired degree of conversion of $SF_6$. Should a higher degree of enrichment be desired, then by means well known in the art the collected products may be converted to $SF_6$ and the process of the instant invention repeated. Likewise, if the undecomposed $SF_6$ is not depleted to the desired level, further depletion may be achieved by repeating the process of the instant invention. The techniques of staging isotopic separation so as to achieve desired levels of enrichment in the product and depletion in the tails are well known. Once the desired enrichment level is reached, the product may be converted to the desired chemical form by methods well known in the art. While the preferred embodiment is for the separation of the isotopes of sulfur, similar conditions, but different laser frequencies and different critical internal energy content is required for the species $UF_6$, etc. However, as noted above, the internal energy requirements are in each case calculated by those skilled in the art, by reference to the requirement that the preferentially excited molecule must be excited at least 4 quanta in the $\nu_3$ vibrational mode.

What is claimed is:

1. An isotope separation process which comprises irradiating a compound comprising an isotopic mixture at conditions wherein one isotope is selectively excited and absorbs more than one photon to form a vibrationally excited compound, combining a thermal electron with said excited compound to form negative ions which undergo unimolecular decomposition to form an ion fragment which can be separated from said isotopic mixture, and collecting said ion fragment.

2. The process of claim 1 wherein said compound has the general formula $MF_6$ wherein M is selected from the group consisting of U, S, W, Se, Te, Mo, Re, and Tc.

3. The process of claim 2 wherein said selectively excited isotope absorbs at least 4 quanta in the $\nu_3$ vibrational mode.

4. The process of claim 3 wherein at least 0.1% of the isotopes being irradiated absorbs at least 4 quanta in the $\nu_3$ vibrational mode.

5. The process of claim 3 wherein M is selected from the group consisting of S and U.

6. The process of claim 5 wherein M is U.

7. The process of claim 2 wherein the ratio of thermal electrons to $MF_6$ is at least 0.1.

8. The process of claim 7 wherein the time $MF_6$ and said thermal electrons are in contact is less than $10^{-3}$ seconds.

9. A process for separating an isotopic mixture of $SF_6$ into two or more parts in each of which the abundances of the isotopes of sulfur differ from the abundances of the isotopes of sulfur in said mixture, which comprises irradiating in a reaction zone a gaseous mixture of $SF_6$ and helium, the partial pressure of $SF_6$ being maintained in said reaction zone at $10^{-4}$ to 10 torr and the partial pressure of helium being maintained at from 0.01 to 1000 times the partial pressure of $SF_6$ with a $CO_2$ laser operating in the 10.6$\mu$ band at a power density of at least $10^4$ watts/cm$^2$ per torr $SF_6$ for an irradiation time of $10^{-8}$ to $10^{-6}$ seconds to produce excited molecules of $^{32}SF_6$ with 3760 to 4000 cm$^{-1}$ internal energy, and simultaneously contacting said gaseous mixture with thermal electrons at a partial pressure of from 0.01 to 100 times the partial pressure of $SF_6$, wherein said contacting is carried out at the equivalent temperature of from 40° K to 600° K for a time of less than $10^{-3}$ seconds, wherein said excited molecules of $^{32}SF_6$ are converted into $^{32}SF_5^-$, and collecting said converted molecules.

* * * * *